United States Patent
Liu et al.

(10) Patent No.: US 12,298,940 B1
(45) Date of Patent: May 13, 2025

(54) TECHNIQUE OF REDUCING SIZE OF BINARY JSON WITH/WITHOUT COMPRESSION

(71) Applicant: Oracle International Corporation, Redwood Shores, CA (US)

(72) Inventors: Zhen Hua Liu, San Mateo, CA (US); Joshua Spiegel, St. Louis, MO (US); Douglas J. McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/622,660

(22) Filed: Mar. 29, 2024

(51) Int. Cl.
 *G06F 16/17* (2019.01)
 *G06F 16/11* (2019.01)
 *G06F 16/174* (2019.01)

(52) U.S. Cl.
 CPC ........ *G06F 16/1744* (2019.01); *G06F 16/116* (2019.01); *G06F 16/1748* (2019.01)

(58) Field of Classification Search
 CPC . G06F 16/1744; G06F 16/116; G06F 16/1748
 USPC ........................................................ 707/692
 See application file for complete search history.

(56) References Cited

U.S. PATENT DOCUMENTS

| | | | | |
|---|---|---|---|---|
| 6,671,853 | B1 * | 12/2003 | Burkett | G06F 16/9574 707/E17.12 |
| 9,639,631 | B2 * | 5/2017 | Williamson | G06F 16/83 |
| 10,275,489 | B1 * | 4/2019 | Muniswamy Reddy | G06F 16/2453 |
| 2006/0212467 | A1 * | 9/2006 | Murthy | G06F 40/123 |
| 2007/0260571 | A1 * | 11/2007 | Mansfield | G06F 40/154 706/48 |
| 2007/0271305 | A1 * | 11/2007 | Chandrasekar | G06F 16/86 |
| 2017/0060912 | A1 * | 3/2017 | Liu | G06F 16/2255 |
| 2017/0060973 | A1 * | 3/2017 | Liu | G06F 16/86 |
| 2020/0210398 | A1 * | 7/2020 | Liu | G06F 16/22 |
| 2020/0226102 | A1 * | 7/2020 | Natanzon | G06F 16/1744 |
| 2021/0117611 | A1 * | 4/2021 | Liu | H03M 7/4031 |

* cited by examiner

*Primary Examiner* — Hicham Skhoun
(74) *Attorney, Agent, or Firm* — Hickman Becker Bingham Ledesma LLP

(57) ABSTRACT

Data structures and methods are described for converting a text format data-interchange file into size efficient binary representations. A method comprises receiving a request to convert a data-interchange file, comprising a hierarchy of nodes, into a binary file. The method further comprises generating a tree representation of the nodes that reference a plurality of leaf values. The method further comprises, in response to determining that the binary file is to be compressed, embedding relative node jump offsets when generating the tree representation. The method further comprises, in response to determining that the data-interchange file is immutable, deduplicating the plurality of leaf values in a space optimized manner. The method further comprises, in response to determining that the data-interchange file is mutable, deduplicating the plurality of leaf values in a stream optimized manner. The method further comprises storing the deduplicated plurality of leaf values in the binary file.

20 Claims, 14 Drawing Sheets

FIG. 1B

```
                      TEXT JSON FILE 142
{
    "person": {
        "id": "123",
        "name": "John",
        "hair_color": "Brown",
        "eye_color": "Brown",
        "birthdate": "1970-01-02"
        "location": {
            "city": "Philadelphia"
            "zip": "19019"
        }
    }
    "person": {
        "id": "124"
        "name": "Chloe"
        "hair_color": "Brown",
        "eye_color": "Blue",
        "birthdate": "1970-01-02"
        "location": {
            "city": "Philadelphia"
            "zip": "19021"
        }
    }
    "pet": {
        "id": "123"
        "owner": "123"
        "name": "Chloe"
    }
}
```

FIG. 2
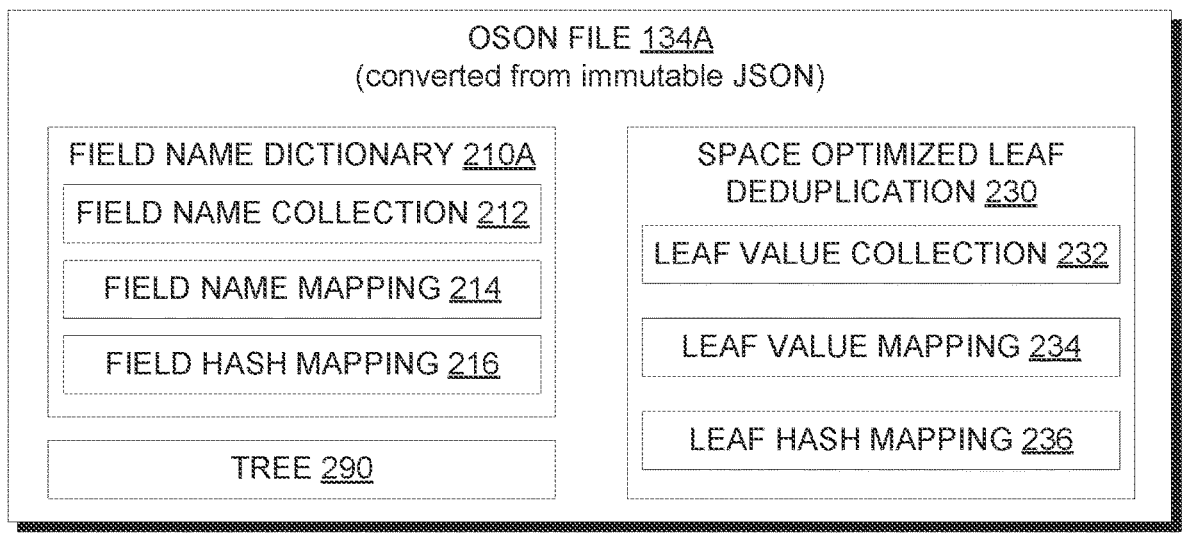
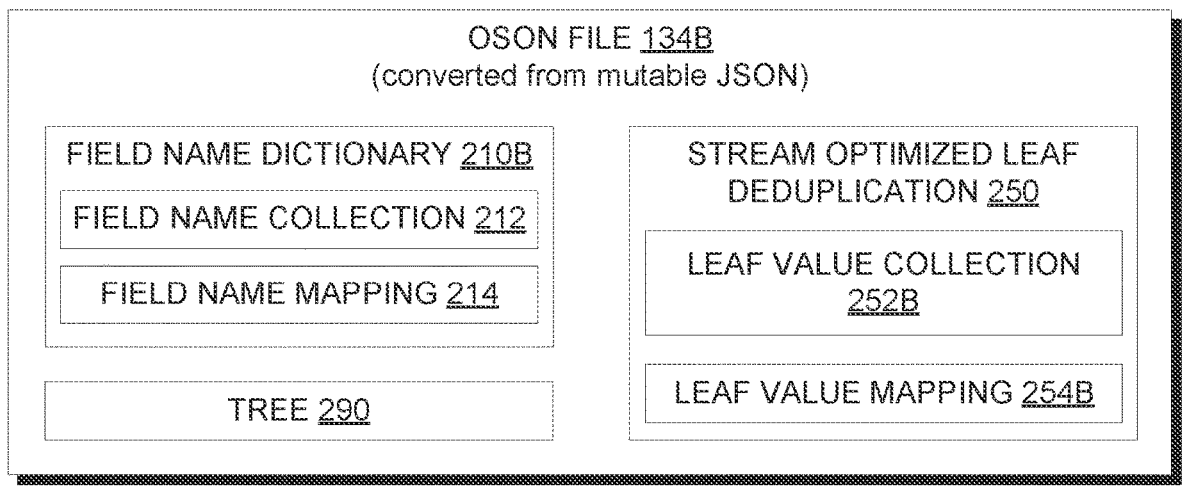
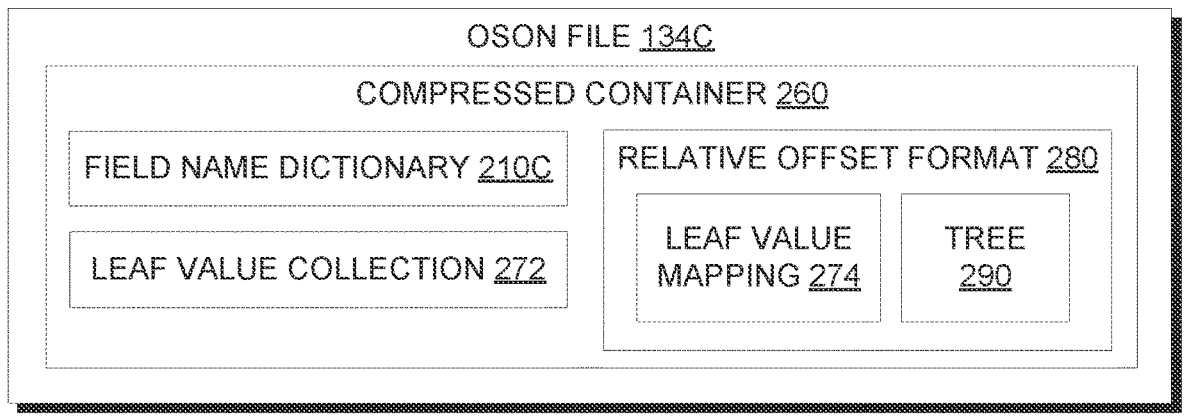

FIG. 3A (Example Field Name Dictionary 210A-210C)

TABLE 300

| FIELD NAME IDENTIFIERS 302 | FIELD NAMES 304 | HASH CODES 306 | TRUNCATED HASH CODES 308 |
|---|---|---|---|
| 0x01 | "birthdate" | 0x1B64F409... | 0x1B |
| 0x02 | "city" | 0x4ED5D2EA... | 0x4E |
| 0x03 | "pet" | 0x6C43C0A8... | 0x6C |
| 0x04 | "owner" | 0x72122CE9... | 0x72 |
| 0x05 | "person" | 0x8B0A4404... | 0x8B |
| 0x06 | "zip" | 0xADCDBD79... | 0xAD |
| 0x07 | "name" | 0xB068931C... | 0xB0 |
| 0x08 | "id" | 0xB80BB774... | 0xB8 |
| 0x09 | "eye_color" | 0xC5A9E390... | 0xC5 |
| 0x0A | "location" | 0xD5189DE0... | 0xD5 |
| 0x0B | "hair_color" | 0xEDAF4A8E... | 0xED |

FIELD NAME COLLECTION 212

```
Offset      Field Name
0x0000      0x06 "person"
0x0007      0x02 "id"
0x000A      0x04 "name"
0x000F      0x0A "hair_color"
0x001A      0x09 "eye_color"
0x0024      0x09 "birthdate"
0x002E      0x08 "location"
0x0037      0x04 "city"
0x003C      0x03 "zip"
0x0040      0x03 "pet"
0x0044      0x05 "owner"

Raw Data:
06706572736F6E026964046E616D65
0A686169725F636F6C6F7209657965
5F636F6C6F720962697274686461744
65086C6F636174696F6E0463697479
037A697003706574056F776E6572
```

FIELD NAME MAPPING 214

```
Field ID    Offset
0x01        0x0024
0x02        0x0037
0x03        0x0040
0x04        0x0044
0x05        0x0000
0x06        0x003C
0x07        0x000A
0x08        0x0007
0x09        0x001A
0x0A        0x002E
0x0B        0x000F Raw Data:
0024003700400044
0000003C000A0007
001A002E000F
```

FIELD HASH MAPPING 216

```
T.Hashcode
0x1B
0x4E
0x6C
0x72
0x8B
0xAD
0xB0
0xB8
0xC5
0xD5
0xED

Raw Data:
1B4E6C72
8BADB0B8
C5D5ED
```

FIG. 3B

TABLE 320

(Example Space Optimized Deduplication 230)

| LEAF VALUE IDENTIFIERS 322 | LEAF VALUES 324 | HASH CODES 326 | TRUNCATED HASH CODES 328 |
|---|---|---|---|
| 0x01 | "19021" | 0x159FC249... | 0x15 |
| 0x02 | "19019" | 0x16D459C4... | 0x16 |
| 0x03 | "123" | 0x202CB962... | 0x20 |
| 0x04 | "Philadelphia" | 0x3064B320... | 0x30 |
| 0x05 | "1970-01-02" | 0x5551D456... | 0x55 |
| 0x06 | "John" | 0x61409AA1... | 0x61 |
| 0x07 | "Blue" | 0x9594EEC9... | 0x95 |
| 0x08 | "Chloe" | 0xC810B2DB... | 0xC8 |
| 0x09 | "124" | 0xC8FFE9A5... | 0xC8 |
| 0x0A | "Brown" | 0xED63FC91... | 0xED |

LEAF VALUE COLLECTION 232

```
Offset      Leaf Value
0x0000      0x03 "123"
0x0004      0x04 "John"
0x0009      0x05 "Brown"
0x0010      0x0A "1970-01-02"
0x001A      0x0C "Philadelphia"
0x0027      0x05 "19019"
0x002D      0x03 "124"
0x0031      0x05 "Chloe"
0x0037      0x04 "Blue"
0x003C      0x05 "19021"

Raw Data:
03313233044A6F686E0542726F776E
0A313937302D30312D30320C506869
6C6164656C70686961053139303139
03313234054368C6F6504426C7565
053139303231
```

LEAF VALUE MAPPING 234

```
Leaf ID     Offset
0x01        0x003C
0x02        0x0027
0x03        0x0000
0x04        0x001A
0x05        0x0010
0x06        0x0004
0x07        0x0037
0x08        0x0031
0x09        0x002D
0x0A        0x0009

Raw Data:
003C00270000001A
0010000400370031
002D0009
```

LEAF HASH MAPPING 236

```
T.Hashcode
0x15
0x16
0x20
0x30
0x55
0x61
0x95
0xC8
0xC8
0xED

Raw Data:
15162030
556195C8
C8ED
```

FIG. 3C (Example default dictionary reservations for common leaf values)

TABLE 340

| LEAF VALUE IDENTIFIERS 342 | LEAF VALUES 344 | HASH CODES 346 | TRUNCATED HASH CODES 348 |
|---|---|---|---|
| 0x01 | null | 0x751D31DD... | 0x75 |
| 0x02 | true | 0x7D066543... | 0x7D |
| 0x03 | false | 0x96A3BE3C... | 0x96 |
| 0x04 | (empty string) | 0xA2EF406E... | 0xA2 |
| 0x05 | 0 | 0xB4B147BC... | 0xB4 |
| 0x06 | 1 | 0xD72D187D... | 0xD7 |
| 0x07 | (empty object) | 0xE45EE7CE... | 0xE4 |
| 0x08 | (empty array) | 0xFAEAC4E1... | 0xFA |

(Hash Optional)

```
LEAF VALUE COLLECTION 252A

[Common Values Reserved]
ID  Offset  Leaf Value
01  0x0000  null
02  0x0004  true
03  0x0008  false
04  0x000C  (empty string)
05  0x0010  0
06  0x0014  1
07  0x0018  (empty object)
08  0x001C  (empty array)

[User Data]
(empty)

Raw Data:
00000000000000010000000000000000
00000000000000000100000000000000
0000
```

```
LEAF VALUE
MAPPING 254A

[Common Values]
Leaf ID   Offset
0x01      0x0000
0x02      0x0004
0x03      0x0008
0x04      0x000C
0x05      0x0010
0x06      0x0014
0x07      0x0018
0x08      0x001C

[User Data]
(empty)

Raw Data:
000000040008000C
001000140018001C
```

```
LEAF HASH
MAPPING
256
T.Hashcode
0x75
0x7D
0x96
0xA2
0xB4
0xD7
0xE4
0xFA

Raw Data:
757D96A2
B4D7E4FA
```

FIG. 3D (Example Stream Optimized Deduplication 250)

LEAF VALUE COLLECTION 252B

[Common Values Reserved]
```
ID Offset Leaf Value
01 0x0000 null
02 0x0004 true
03 0x0008 false
04 0x000C (empty string)
05 0x0010 0
06 0x0014 1
07 0x0018 (empty object)
08 0x001C (empty array)
```

[User Data]
```
ID Offset Leaf Value
09 0x0020  0x03 "123"
0A 0x0024  0x04 "John"
0B 0x0029* 0x05 "Brown"
0C 0x002F  0x0A "1970-01-02"
0D 0x003A  0x0C "Philadelphia"
0E 0x0047  0x05 "19019"
0F 0x004D  0x03 "124"
10 0x0051  0x05 "Chloe"
11 0x0057  0x05 "Brown"
12 0x005D  0x04 "Blue"
13 0x0062  0x0A "1970-01-02"
14 0x006D  0x0C "Philadelphia"
15 0x007A  0x05 "19021"
16 0x0080* 0x03 "123"
17 0x0084  0x05 "Chloe"
```

Raw Data: 000000000000000100000
0000000000000000000000001000000
000000000003313233044A6F686E0542
726F776E0A313937302D30312D30320C
5068696C6164656C7068696105313930
31390331323404543686C6F650542726F
776E04426C75650A313937302D30312D
30320C5068696C6164656C7068696105
3139303231033132330543686C6F65

LEAF VALUE MAPPING 254B

```
Leaf Offset Last Leaf Value
ID          in Parent Obj.
0x01 0x0000 n/a
0x02 0x0004 n/a
0x03 0x0008 n/a
0x04 0x000C n/a
0x05 0x0010 n/a
0x06 0x0014 n/a
0x07 0x0018 n/a
0x08 0x001C n/a
0x09 0x0020 (no last leaf)
0x0A 0x0024 "123"
0x0B 0x0029 "John"
0x0C 0x0029 "Brown"
0x0D 0x002F "Brown"
0x0E 0x003A (no last leaf)
0x0F 0x0047 "Philadelphia"
0x10 0x004D (no last leaf)
0x11 0x0051 "124"
0x12 0x0057 "Chloe"
0x13 0x005D "Brown"
0x14 0x0062 "Blue"
0x15 0x006D (no last leaf)
0x16 0x007A "Philadelphia"
0x17 0x0080 (no last leaf)
0x18 0x0080 "123"
0x19 0x0084 "123"
```

Raw Data:
000000040008000C00100014
0018001C0020002400290029
002F003A0047004D00510057
005D0062006D007A00800080
0084

FIG. 3E (Compression friendly relative address leaf value dictionary)

```
LEAF VALUE COLLECTION 272

Offset      Leaf Value

[person - base 0x0000]
0x0000      0x03 "123"
0x0004      0x04 "John"
0x0009      0x05 "Brown"
0x000F      0x05 "Brown"
0x0015      0x0A "1970-01-02"

[location - base 0x0020]
0x0020      0x0C "Philadelphia"
0x002D      0x05 "19019"

[person - base 0x0033]
0x0033      0x03 "124"
0x0037      0x05 "Chloe"
0x003D      0x05 "Brown"
0x0043      0x04 "Blue"
0x0048      0x0A "1970-01-02"

[location - base 0x0053]
0x0053      0x0C "Philadelphia"
0x0060      0x05 "19021"

[pet - base 0x0066]
0x0066      0x03 "123"
0x006A      0x03 "123"
0x006E      0x05 "Chloe"

Raw Data:
03313233044A6F686E0542726F776E05
42726F776E0A313937302D30312D3032
0C5068696C6164656C70686961053139
303139033132340543686C6F65054272
6F776E04426C75650A313937302D3031
2D30320C5068696C6164656C70686961
053139303231033132333033132330543
686C6F65
```

```
LEAF VALUE MAPPING 274

Leaf ID     Relative Offset

[person - base 0x0000]
0x01        0x0000
0x02        0x0004
0x03        0x0009
0x04        0x000F
0x05        0x0015

[location - base 0x0020]
0x06        0x0000
0x07        0x000D

[person - base 0x0033]
0x08        0x0000
0x09        0x0004
0x0A        0x000A
0x0B        0x0010
0x0C        0x0015

[location - base 0x0053]
0x0D        0x0000
0x0E        0x000D

[pet - base 0x0066]
0x0F        0x0000
0x10        0x0004
0x11        0x0008

Raw Data:
000000040009000F00150000
000D00000004000A00100015
0000000D000000040008
```

TECHNIQUE OF REDUCING SIZE OF BINARY JSON WITH/WITHOUT COMPRESSION

CROSS-REFERENCE TO RELATED APPLICATIONS

This application is related to U.S. patent application Ser. No. 14/836,680, titled "Techniques Related to Binary Encoding of Hierarchical Data Objects to Support Efficient Path Navigation of the Hierarchical Data Objects", filed Aug. 26, 2015, the entire contents of which is hereby incorporated by reference as if fully set forth herein.

FIELD OF THE INVENTION

Embodiments of the present invention relate to converting text format data-interchange files, such as JavaScript Object Notation (JSON) files, into size efficient binary representations. More particularly, embodiments of the present invention relate to techniques to convert JSON files into Oracle binary JSON (OSON) files with reduced file sizes in both compressed and uncompressed formats while supporting high performance for query processing and partial updates.

BACKGROUND

JavaScript Object Notation (JSON) is an open standard file format and data interchange format that uses human-readable text to store and transmit data objects consisting of attribute-value pairs and arrays. JSON is a language-independent data format developed in the early 2000s. Internet Engineering Task Force (IETF) Request for Comments (RFC) 4627 provides further detail and specifies that JSON can represent four primitive types (strings, numbers, Booleans and null) and two structured types (objects and arrays).

JSON files are frequently used in database environments, such as relational database and graph database environments. When JSON files are used in database environments, the JSON files can become large and consume excessive storage space and/or be inefficient to search. Other shortcomings may also exist with respect to the use of JSON files in database environments.

While JSON files can be converted into binary representations for more efficient usage in database environments, existing approaches may suffer from several drawbacks. For example, Binary JSON (BSON), as used by MongoDB, is a binary representation that is a serialization of JSON text into binary data. However, since this serialization lacks any metadata structures for navigation, traversal and partial updates to the BSON may require parsing the entire BSON file, a computationally expensive process. Additionally, the BSON file may still require significant storage space in proportion to the original JSON file. While general purpose compression algorithms may be applied to the BSON file to reduce storage footprint, this also necessitates a decompression of the entire BSON file prior to any database operations, precluding efficient random access and updates.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 1B is a listing of an example JSON file.

FIG. 2 depicts data structures within example OSON files.

FIG. 3A depicts example data structures for a field name dictionary of an OSON file.

FIG. 3B depicts example space optimized deduplicated leaf values of an OSON file.

FIG. 3C depicts example default dictionary reservations for common leaf values.

FIG. 3D depicts example stream optimized deduplicated leaf values of an OSON file.

FIG. 3E depicts an example compression friendly relative address leaf value dictionary of an OSON file.

DETAILED DESCRIPTION

Figure 1A:
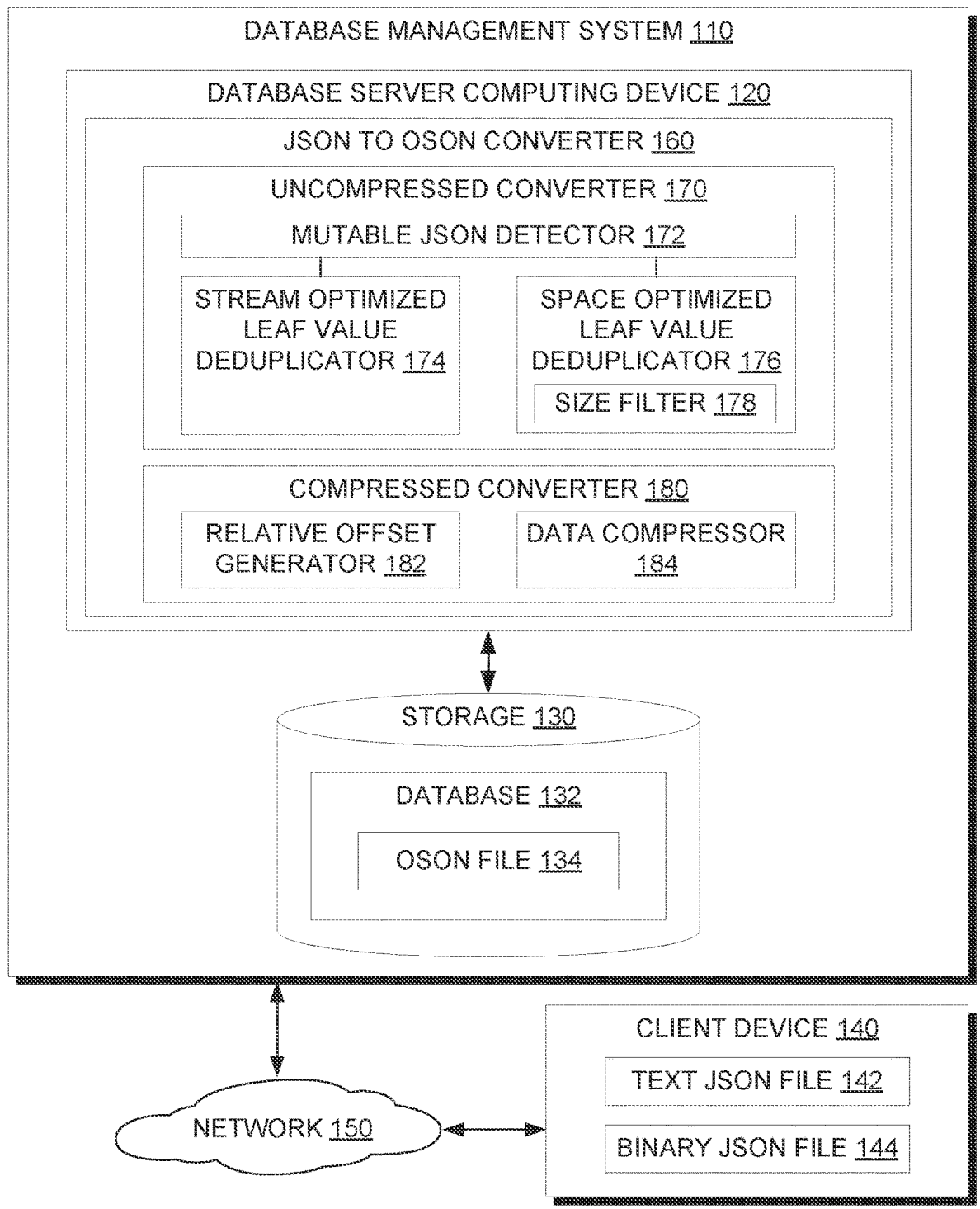
FIG. 1A is a block diagram that depicts an example network arrangement for a database management system (DBMS) in which a conversion of a JSON file into an Oracle binary JSON (OSON) file may be supported.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Data structures and methods are described for converting a text format data-interchange file, such as JavaScript Object Notation (JSON) file, into size efficient binary representations, referred to herein as Oracle binary JSON (OSON). OSON is an open format that is provided to the public and is available from Oracle Corporation of Austin, Texas, USA.

When the OSON file is to be compressed, a tree representation of the JSON file is built with compression friendly relative node jump offsets instead of absolute node jump offsets. Additionally, relative offsets may also be used for leaf value mappings. Higher compression ratios are thereby attainable, as relative offsets have less entropy than absolute offsets. Deduplication of field names and leaf values may also be omitted when the OSON file is to be compressed, as the compression can perform a similar size reduction as the deduplication.

When the OSON file is to be uncompressed, a determination is made wither the JSON file is mutable or immutable (read-only). When the JSON file is mutable, then the leaf values to be stored in the OSON file are deduplicated in a stream optimized manner. For example, the last leaf value for each parent node can be tracked. When a leaf node to be processed has a leaf value that matches the last leaf value, then the adjacent leaves with the same parent node can reference a shared leaf value that is deduplicated, or stored once in the OSON file. This stream optimized deduplication can be implemented with minimal overhead, thereby preserving database query and update performance.

When the JSON file is immutable (read-only), then the leaf values to be stored in the OSON file are deduplicated in a space optimized manner. For example, the entire JSON file may be analyzed and at least a subset of the leaf values can be made unique during the deduplication. The subset can correspond to each of the leaf values in the JSON file, or to leaf values that do not exceed a threshold size. While performing this space optimized deduplication incurs a one-time processing penalty, this may be offset by reducing storage footprint and accelerating multiple future database reads.

Accordingly, a size efficient OSON format is provided for JSON. When the OSON is to be compressed, the offsets are stored as relative offsets to reduce entropy for facilitated compression. When the OSON is to be uncompressed, the leaf values are deduplicated using a space optimized or stream optimized manner depending on whether the JSON is mutable or immutable. In this manner, the OSON file size may be reduced in both compressed or uncompressed formats while maintaining high performance for database queries and partial updates.

Network Arrangement Architecture

FIG. 1A is a block diagram that depicts an example network arrangement 100 for a database management system 110 in which a conversion of text JSON file 142 into OSON file 134 may be supported, according to one or more embodiments. Network arrangement 100 includes a client device 140 and a database management system 110 communicatively coupled via a network 150. Network 150 may be implemented with any type of medium and/or mechanism that facilitates the exchange of information between client device 140 and database management system 110. Network arrangement 100 may include other devices, including client devices, server devices, storage devices, and display devices, according to one or more embodiments.

Client device 140 may be implemented by any type of computing device that is communicatively connected to network 150. In network arrangement 100, client device 140 is configured with a database client, which may be implemented in any number of ways, including as a stand-alone application running on client device 140, or as a plugin to a browser running at client device 140, etc. Client device 140 may submit one or more database queries and/or database administration commands to database management system 110. For example, client device 140 may request text JSON file 142 or binary JSON file 144 to be loaded, converted, and stored as OSON file 134. Client device 140 may be configured with other mechanisms, processes and functionalities, depending upon a particular implementation.

In network arrangement 100, database management system 110 includes one or more server nodes, such as database server computing device 120. Database server computing device 120 is implemented by any type of computing device that is capable of communicating with client device 140 over network 150.

Database server computing device 120 maintains access to and manages data in database 132 (i.e., on storage 130).

According to one or more embodiments, access to a given database comprises access to (a) a set of disk drives storing data for the database, and (b) data blocks stored thereon. Database 132 may reside in any type of storage 130, including volatile and non-volatile storage, e.g., random access memory (RAM), one or more hard disks, main memory, etc.

Database server computing device 120 includes JSON to OSON converter 160. For example, client device 140 may issue an administrative command to database management system 110 to request conversion of text JSON file 142 or binary JSON file 144 into OSON file 134. JSON to OSON converter 160 may determine whether OSON file 134 is to be uncompressed to compressed and utilizes uncompressed converter 170 or compressed converter 180, respectively, to generate OSON file 134 from the requested input, e.g. text JSON file 142.

Uncompressed converter 170 utilizes mutable JSON detector 172 to determine whether the input JSON is mutable or immutable and utilizes stream optimized leaf value deduplicator 174 or space optimized leaf value deduplicator 176, respectively, to deduplicate the leaf values to be stored in OSON file 134. Space optimized leaf value deduplicator 176 may optionally utilize size filter 178 to skip deduplication of leaf values above a threshold size. When compared to space optimized leaf value deduplicator 176, stream optimized leaf value deduplicator 174 may configure OSON file 134 to support higher DBMS performance for partial updates in exchange for greater storage requirements.

Compressed converter 180 utilizes relative offset generator 182 to embed relative jump offsets for various data structures to be stored in OSON file 134, such as leaf value mappings and tree node navigation structures. Since relative jump offsets have less data entropy than absolute jump offsets, data compressor 184 can achieve a higher compression ratio when compressing the data embedded by relative offset generator 182. Thus, regardless of whether OSON file 134 is uncompressed or compressed, a storage footprint of OSON file 134 can be reduced.

Any of the functionality attributed to database management system 110 herein may be performed by any other entity, which may or may not be depicted in network arrangement 100, according to one or more embodiments. For example, in some embodiments, JSON to OSON converter 160 may instead be implemented on client device 140. Database server computing device 120 may also be configured with other mechanisms, processes and functionalities, depending upon a particular implementation.

In an embodiment, each of the processes and/or functionality described in connection with database management system 110, database server computing device 120 and/or database 132 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

JSON File Listing

FIG. 1B is a listing of an example text JSON file 142. Binary JSON file 144 may contain contents similar to text JSON file 142, but serialized as binary data. When JSON to OSON converter 160 receives a request to convert binary JSON file 144 to OSON, binary JSON file 144 may be first converted to a text JSON representation for processing, or alternatively a plug-in or specialized binary converter may be used to efficiently convert the binary format to OSON.

For illustrative purposes, the examples described herein will focus on text JSON to OSON conversion.

As shown in FIG. 1B, text JSON file 142 provides a hierarchy of nodes including two "person" objects and one "pet" object, each with various child nodes. Parsing of text JSON file 142 naturally follows a depth first traversal. In some embodiments, text JSON file 142 may be immutable or read-only, such as by including blocks of a blockchain or other immutable data, which are detectable by mutable JSON detector 172. In other embodiments, a conversion request to JSON to OSON converter 160 may explicitly specify that text JSON file 142 is to be treated as read-only.

OSON Files

FIG. 2 depicts data structures within example OSON file 134A, OSON file 134B, and OSON file 134C. OSON file 134A may be generated via space optimized leaf value deduplicator 176. OSON file 134B may be generated via stream optimized leaf value deduplicator 174. OSON file 134C may be generated via compressed converter 180.

Each OSON file 134A-134C includes tree 290, which may correspond to a tree representation of the hierarchy of nodes shown in text JSON file 142. Each OSON file 134A-134C also includes a respective field name dictionary 210A-210C, which define the field names from text JSON file 142. Each OSON file 134A-134C also includes a leaf dictionary, which may include leaf value collections, leaf value mappings, and optional leaf hash mappings. The leaf dictionaries of OSON files 134A-134B may be reduced in size via deduplication. The leaf dictionary of OSON file 134C may be reduced in size via compression instead of deduplication.

OSON file 134A may correspond to a conversion from text JSON file 142 as immutable JSON. Accordingly, space optimized leaf value deduplicator 176 may be utilized to generate space optimized leaf deduplication 230, which includes leaf value collection 232, leaf value mapping 234, and leaf hash mapping 236. Leaf value collection 232 may correspond to a collection of leaf values that have been deduplicated in a space optimized manner. Leaf value mapping 234 may be a data structure that maps identifiers to offsets within leaf value collection 232. Leaf hash mapping 236 may be a lookup data structure, such as a hash table, that associates leaf value mapping 234 to associated lookup values, such as hash values. The combination of data structures in space optimized leaf deduplication 230 allows database management system 110 to quickly encode and identify objects from text JSON file 142.

OSON file 134B may correspond to a conversion from text JSON file 142 as mutable JSON. Accordingly, stream optimized leaf value deduplicator 174 may be utilized to generate stream optimized leaf deduplication 250, which includes leaf value collection 252B and leaf value mapping 254B. Leaf value collection 252B and leaf value mapping 254B may include default initial values for commonly encountered values, with appended user defined leaf values as they are encountered in text JSON file 142. To provide a lightweight deduplication that incurs minimal overhead, the appended user defined leaf values may be deduplicated when adjacent leaf nodes of a parent node have identical values, rather than attempting to deduplicate all leaf values. Since matching to previous leaf values is not as critical in this stream optimized deduplication, a lookup data structure similar to leaf hash mapping 236 may be omitted from stream optimized leaf deduplication 250.

OSON file 134C may correspond to a conversion from text JSON file 142 that is intended to be compressed. Accordingly, the data of OSON file 134C may be placed in compressed container 260, which includes field name dictionary 210C, leaf value collection 272, leaf value mapping 274, and tree 290. Compressed container 260 may use any compression algorithm and may be optionally encrypted. To reduce data entropy and enable a higher compression ratio for compressed container 260, relative offset generator 182 may be used to configure one or more data structures, such as leaf value mapping 274 and tree 290, to use relative offset format 280 instead of absolute offsets.

Field Name Dictionary

FIG. 3A depicts example data structures for field name dictionary 210A-210C of respective OSON file 134A-134C. Table 300 includes field name identifiers 302, field names 304, hash codes 306, and truncated hash codes 308. Table 300 may be built in a manner similar to table 200 as described in FIG. 2 and related text of U.S. patent application Ser. No. 14/836,680.

For example, JSON to OSON converter 160 may parse field names 304 from text JSON file 142 and generate hash codes 306 using any hash function, such as Message-Digest Algorithm (MD5) or Secure Hash Algorithm 1 (SHA-1). Note that in the Figures, only the most significant 32 bits of each hash code are shown for simplicity. To reduce storage requirements, the hash codes 306 may be further shortened to truncated hash codes 308 using any modulo or mask function, such as by masking to select only the most significant byte, as shown. As described in U.S. patent application Ser. No. 14/836,680, hash code collisions can be resolved by comparing string lengths or string values. Truncated hash codes 308 may be sorted in any order, e.g. ascending numeric order, to assign field name identifiers 302 to field names 304 using e.g. incremental integer values. While table 300 is configured as a hash table, any lookup data structure can be utilized.

Field name collection 212 may be built as text JSON file 142 is parsed. Each field name in field name collection 212 can be written as it is encountered in text JSON file 142. For example, the first encountered field name is "person", which is 6 bytes long, and thus is prefaced with "0x06" as a length indicator. The field name entries can be concatenated together to form the raw data as shown. While the offsets are shown for clarity, it should be understood that the raw data of field name collection 212 does not include the offsets, which are instead indicated by field name mapping 214.

It can be observed that duplicate entries can be omitted in field name collection 212. For example, the field name "person" appears twice in text JSON file 142, but is only stored once in field name collection 212. By performing a lookup in table 300 prior to writing a field name, field names that have already been previously written can be detected, and thus duplicate entries for field name collection 212 can be omitted.

As shown in field name collection 212, each entry includes a single byte length indicator and a string of single byte American Standard Code for Information Interchange (ASCII) characters. However, other encoding methods are possible, such as null terminated strings and multi-byte character encodings such as Unicode.

Field name mapping 214 may map field name identifiers 302 to offsets within field name collection 212. For example, for field ID 0x0001, the offset is given as "0x0024", which means that the string 0x09 "birthdate" is located at offset 0x0024 in field name collection 212. As shown in the raw data, only the offsets are stored, as the field ID can be inferred by the position of the entries in field name mapping 214.

Field hash mapping 216 maps field name identifiers 302 to truncated hash codes 308. For example, field ID 0x01 is mapped to truncated hash code "0x1B". Similar to field name mapping 214, the field ID can be inferred by position in the raw data and may thus be omitted.

As shown by field name dictionary 210A, the combination of field name collection 212, field name mapping 214, and field hash mapping 216 can be used to recreate table 300. In cases where a lookup data structure such as a hash table is optional, field hash mapping 216 may be omitted, as shown in field name dictionary 210B. In this case, field name collection 212 and field name mapping 214 may be a straightforward serialization of field names that may include duplicate values. Similarly, field name dictionary 210C may also be a straightforward serialization of field names since compressed container 260 can provide file size reduction.

While string length indicators, field name identifiers 302, and truncated hash codes 308 are shown to occupy a single byte and offsets of field name mapping 214 are shown to occupy two bytes, the sizing of the data structures shown in the Figures are exemplary and can be sized and resized according to anticipated workload and data set size.

Space Optimized Deduplicated Leaf Dictionary

FIG. 3B depicts example space optimized leaf deduplication 230 of OSON file 134A. Table 320 includes leaf value identifiers 322, leaf values 324, hash codes 326, and truncated hash codes 328. Table 320 may be generated in a manner similar to table 300 of FIG. 3A, but by parsing leaf values instead of field names in text JSON file 142. Space optimized deduplication 230 may also be created in a manner similar to field name dictionary 210A, wherein space optimized deduplication 230 includes leaf value collection 232, leaf value mapping 234, and leaf hash mapping 236.

As shown in leaf value collection 232, the leaf values may be deduplicated such that each of the leaf values is unique. Thus, the deduplication is space optimized. In some embodiments, size filter 178 may be utilized to skip deduplication of leaf values that exceed a size threshold. In this case, only a subset of the leaf values may be unique. Further, while space optimized leaf deduplication 230 is demonstrated using scalar leaf values, it should be understood that the deduplication techniques described herein can also be applied to other value collections, such as JSON array objects or nested JSON objects.

Example Default Dictionary Reservations for Common Leaf Values

FIG. 3C depicts example default dictionary reservations for common leaf values. Table 340 may be structured similar to table 320 and includes leaf value identifiers 342, leaf values 344, hash codes 346, and truncated hash codes 348. As shown in table 340, leaf values 344 are prepopulated with reserved scalar values that are likely to be commonly encountered when parsing JSON files. Thus, prior to reading any leaf values from text JSON file 142, stream optimized leaf value deduplicator 174 may prepopulate leaf values 344 with null, true, false, empty string, 0, 1, empty object, and empty array. These values are exemplary and any set of default values may be used. When text JSON file 142 is known to be mutable, these default entries will be helpful to accelerate initial parsing and any future partial updates.

As shown in FIG. 3C, the lookup data structure, or hash table portion, may be optional. For example, to accelerate stream processing, hashes of incoming JSON leaf values may be omitted in stream optimized leaf deduplication 250. Since the number of reserved dictionary entries in table 340 may be limited in quantity, or eight (8) entries in the example shown in FIG. 3C, a lookup data structure may be unnecessary to quickly resolve leaf value identifiers of common leaf values. Thus, stream optimized leaf value deduplicator 174 may begin by generating leaf value collection 252A and leaf value mapping 254A prior to parsing text JSON file 142, as indicated by the empty user data areas.

Stream Optimized Deduplicated Leaf Dictionary

FIG. 3D depicts example stream optimized leaf deduplication 250 of OSON file 134B. After parsing text JSON file 142, stream optimized leaf value deduplicator 174 may populate the user data areas of leaf value collection 252A and leaf value mapping 254A to generate leaf value collection 252B and leaf value mapping 254B, respectively, which are both contained in stream optimized leaf deduplication 250.

As shown in leaf value collection 252B, leaf values may be written as encountered in text JSON file 142, with the exception that adjacent identical leaf values may be mapped to a single shared leaf value within a parent node. This is indicated for leaf value ID 0B, or "Brown" in a "person" parent object, and leaf value ID 16, or "123" in a "pet" parent object. Referring to leaf value mapping 254B, it can be observed that leaf ID 0x0B and 0x0C both refer to offset 0x0029, or leaf value ID 0B, and leaf ID 0x17 and 0x18 both refer to offset 0x0080, or leaf value ID 16. This type of deduplication may be especially effective for unstructured lists and arrays where duplicate values are often repeated.

While leaf value collection 252B is not deduplicated as aggressively as leaf value collection 232, stream optimized leaf value deduplicator 174 can generate leaf value collection 252B with minimal overhead since leaf values only need to be compared to a prior leaf value maintained for each parent node, as illustrated by the "Last Leaf Value in Parent Obj." column in leaf value mapping 254B. Since maintenance of a hash table or other lookup data structure can be avoided, stream optimized leaf value deduplicator 174 can still reduce the file size of OSON file 134B while incurring minimal performance impacts.

Compression Friendly Leaf Value Dictionary

FIG. 3E depicts an example compression friendly relative address leaf value dictionary of OSON file 134C. As shown in leaf value collection 272, the leaf values can be written as they are read from text JSON file 142 without attempting any deduplication. Optionally, leaf value mapping 274 may be written using relative offsets instead of absolute offsets. Thus, as shown in leaf value mapping 274, each offset is relative to its parent object. In this manner, the entropy of leaf value mapping 274 can be reduced, allowing a higher compression ratio to be achieved for compressed container 260. As shown by the inclusion of tree 290 in relative offset format 280, tree 290 may also utilize relative offsets for node navigation to achieve a higher compression ratio, as shown in more detail in conjunction with FIG. 4 below.

Tree Representation of Json Nodes

Figure 4:
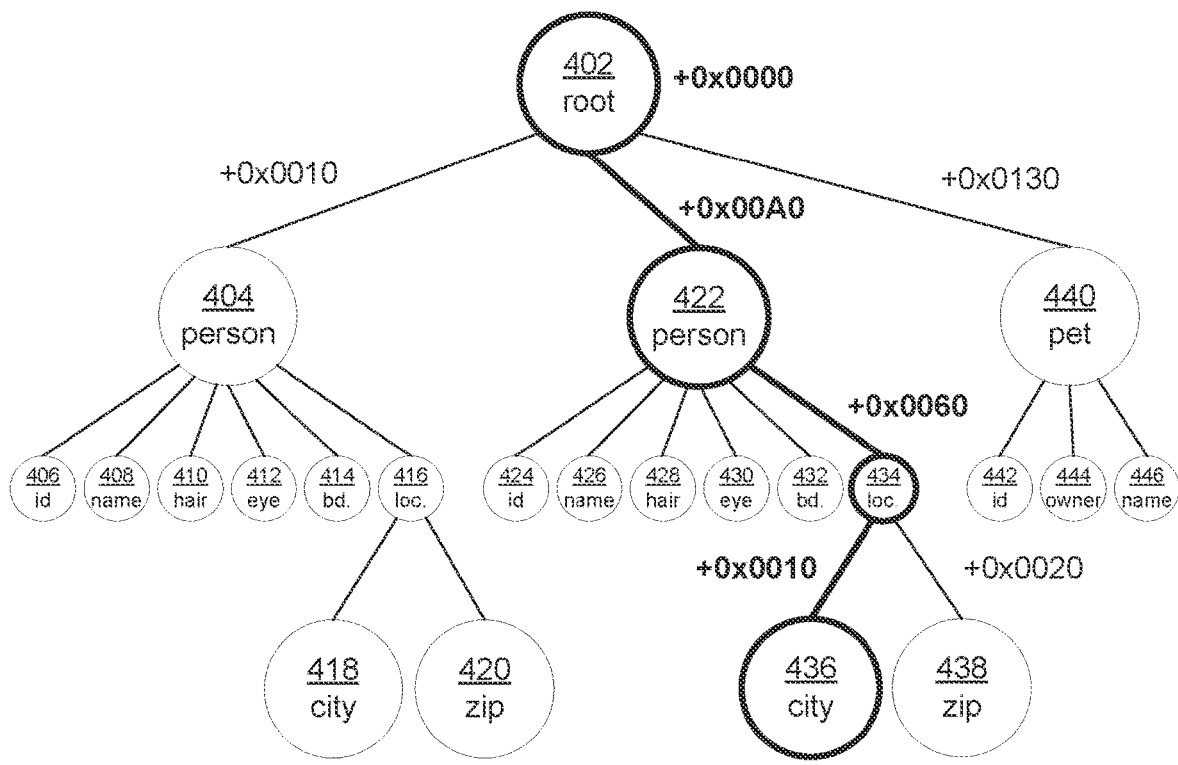
FIG. 4 depicts an example tree representing a hierarchy of nodes from a JSON file, absolute and relative node jump offset tables for the tree, and an example traversal of the tree using relative offsets.

FIG. 4 depicts an example tree 290 representing a hierarchy of nodes from text JSON file 142, absolute node jump offsets 480 and relative node jump offsets 490 for tree 290, and an example traversal 495 of tree 290 using relative offsets. Tree 290 includes node 402, node 404, node 406, node 408, node 410, node 412, node 414, node 416, node 418, node 420, node 422, node 424, node 426, node 428, node 430, node 432, node 434, node 436, node 438, node 440, node 442, node 444, and node 446. Tree 290 may be built in a manner similar to hierarchical tree of nodes 400 as described in FIG. 4 and related text of U.S. patent application Ser. No. 14/836,680.

For purposes of illustration, it may be assumed that each of nodes 402-446 occupies 0x10 bytes, although each node may actually occupy a variable size depending on the node type, number of child nodes, etc. As shown in absolute node jump offsets 480, nodes 402-446 are concatenated together in tree 290 according to a parsing order of nodes from text JSON file 142. Absolute node jump offsets 480 may be embedded in nodes 402-446 of tree 290, for example by including jump offsets to child nodes in each parent node.

To provide a compression friendly form of tree 290, relative node jump offsets 490 may be embedded instead of absolute node jump offsets 480. In this case, a current offset may be maintained while traversing tree 290. For example, a query may be issued to retrieve a city where the person "Chloe" lives. Database management system 110 may generate a corresponding traversal 495 to retrieve the requested data to answer the query. To find the node for the city where Chloe lives, or node 436, the relative offsets for each node in traversal 495 may be added together, or node 402+node 422+node 434+node 436=0x0000+0x00A0+0x0060+0x0010=0x0110. This matches the offset of node 436=0x0110 in absolute node jump offsets 480.

Relative node jump offsets 490 can be compressed with a higher compression ratio since it has less data entropy than absolute node jump offsets 480. For example, it can be seen that the offset "0x0010" appears several times in relative node jump offsets 490, whereas it appears only once in absolute node jump offsets 480. Thus, by using relative offset format 280 for tree 290 in OSON file 134C, a higher compression ratio can be achieved for compressed container 260.

Parent Node in Tree Representation

Figure 5A:
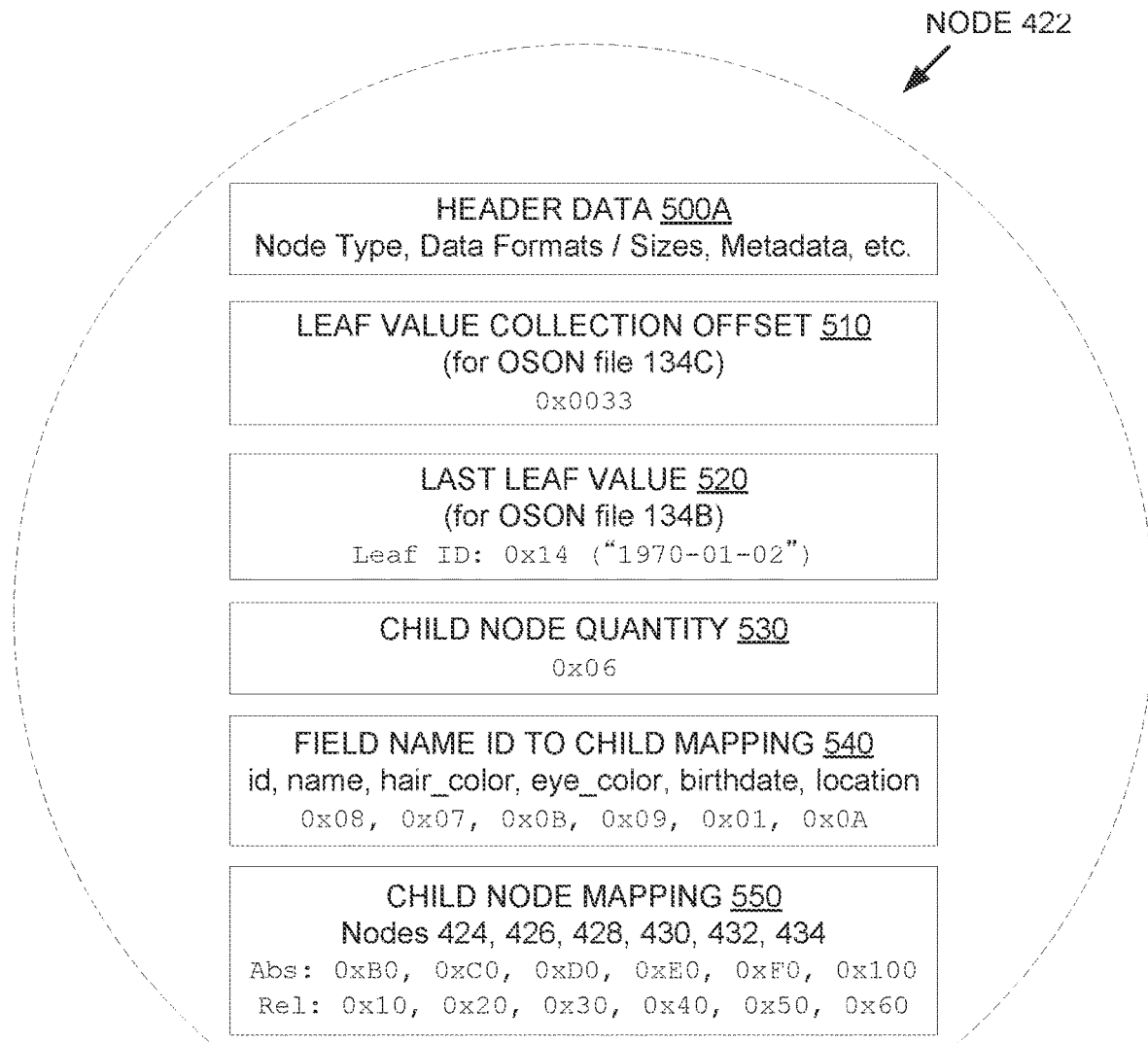
FIG. 5A depicts example data structures within a parent node of a tree.

FIG. 5A depicts example data structures within node 422 of tree 290. Node 422 includes header data 500A, leaf value collection offset 510, last leaf value 520, child node quantity 530, field name ID to child mapping 540, and child node mapping 550. The data structures of node 422 may be similar to those shown in node 404 as described in FIG. 5 and related text of U.S. patent application Ser. No. 14/836,680, but augmented with some new data structures including leaf value collection offset 510 and last leaf value 520.

As shown in FIG. 5A, node 422 of this application may share several fields with node 404 of U.S. patent application Ser. No. 14/836,680. Header data 500A may include metadata such as node type, data format and data size definitions, etc. Child node quantity 530 identifies a number of child nodes connected to node 422. Field name ID to child mapping 540 identifies the field names of the child nodes connected to node 422, as defined by field name mapping 214 and field name collection 212.

Leaf value collection offset 510 may define an offset of node 422 (person-base 0x0033) within leaf value collection 272, thereby allowing the relative offsets of leaf value mapping 274 to be utilized. Leaf value collection offset 510 may be present when node 422 is stored in tree 290 in relative offset format 280 within compressed container 260 of OSON file 134C.

Last leaf value 520 identifies the value of the last leaf in parent node 422, or leaf ID 0x014="1970-01-02". Last leaf value 520 may be present when node 422 is stored in tree 290 of OSON file 134B, which includes stream optimized leaf deduplication 250.

Child node mapping 550 defines the child nodes connected to node 422, or nodes 424, 426, 428, 430, 432, and 434. Absolute offsets to the child nodes may be used when node 422 is stored uncompressed in tree 290 of OSON file 134A and 134B, whereas relative offsets to the child nodes may be used when node 422 is stored in tree 290 in relative offset format 280 within compressed container 260 of OSON file 134C.

Leaf Nodes Referencing Shared Value in Tree Representation

Figure 5B:
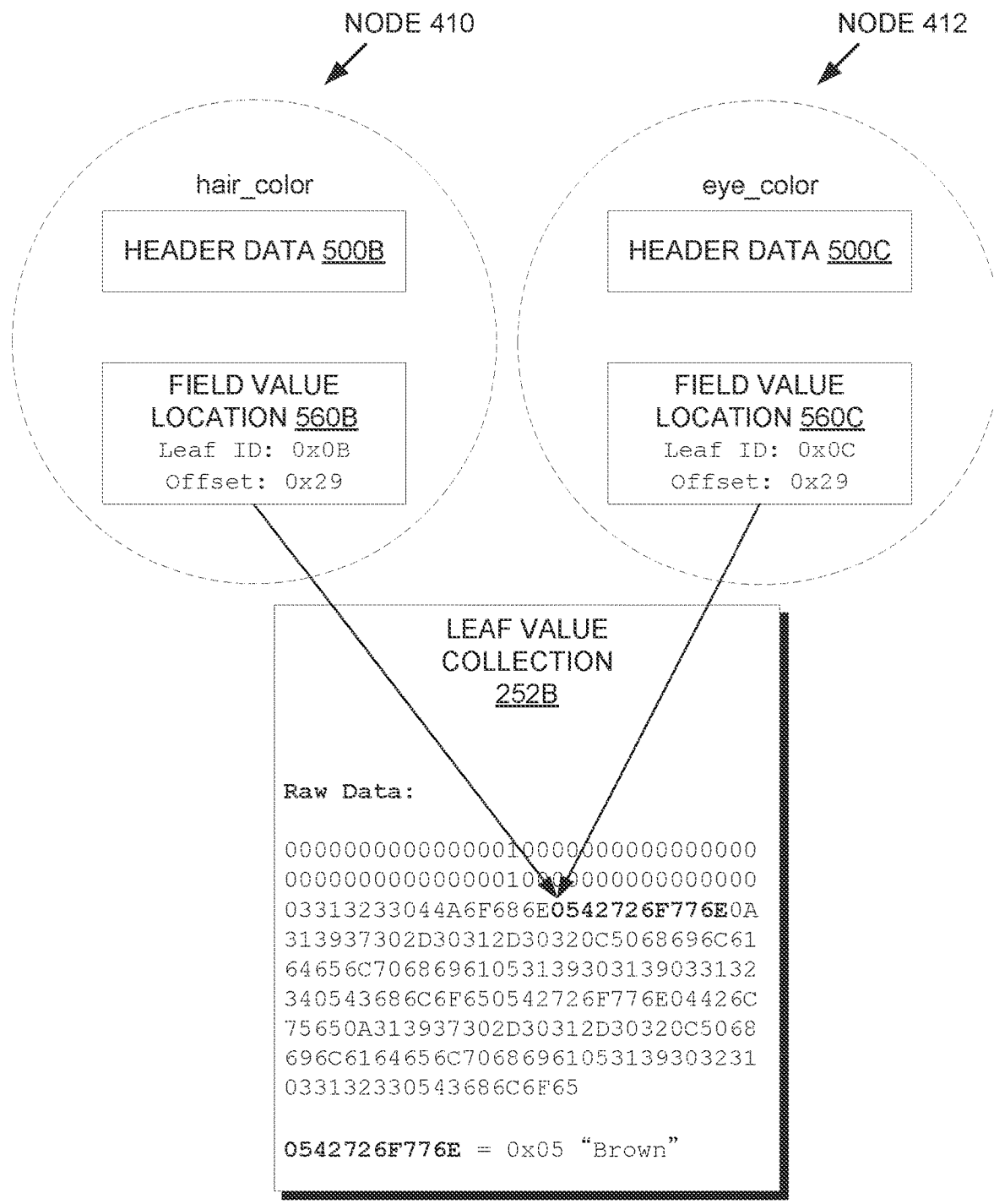
FIG. 5B depicts example data structures within adjacent leaf nodes of a tree.

FIG. 5B depicts example data structures within nodes 410 and 412 of tree 290. Node 410 includes header data 500B and field value location 560B. Node 412 includes header data 500C and field value location 560C.

As shown in FIG. 5B, field value locations 560B and 560C within respective adjacent leaf nodes 410 and 412 reference the same offset "0x29" in leaf value collection 252B, or the leaf value "Brown". Thus, both the "hair_color" and "eye_color" leaf nodes for the "John" person parent object reference "Brown" as a shared value that is stored once in leaf value collection 252B. This stream optimized deduplication reduces the storage footprint of leaf value collection 252B while minimizing additional processing overhead, since each additional leaf node value only needs to be compared to the last leaf value of its parent node to perform deduplication by sharing the same value offset.

Process for Converting JSON to OSON

Figure 6:
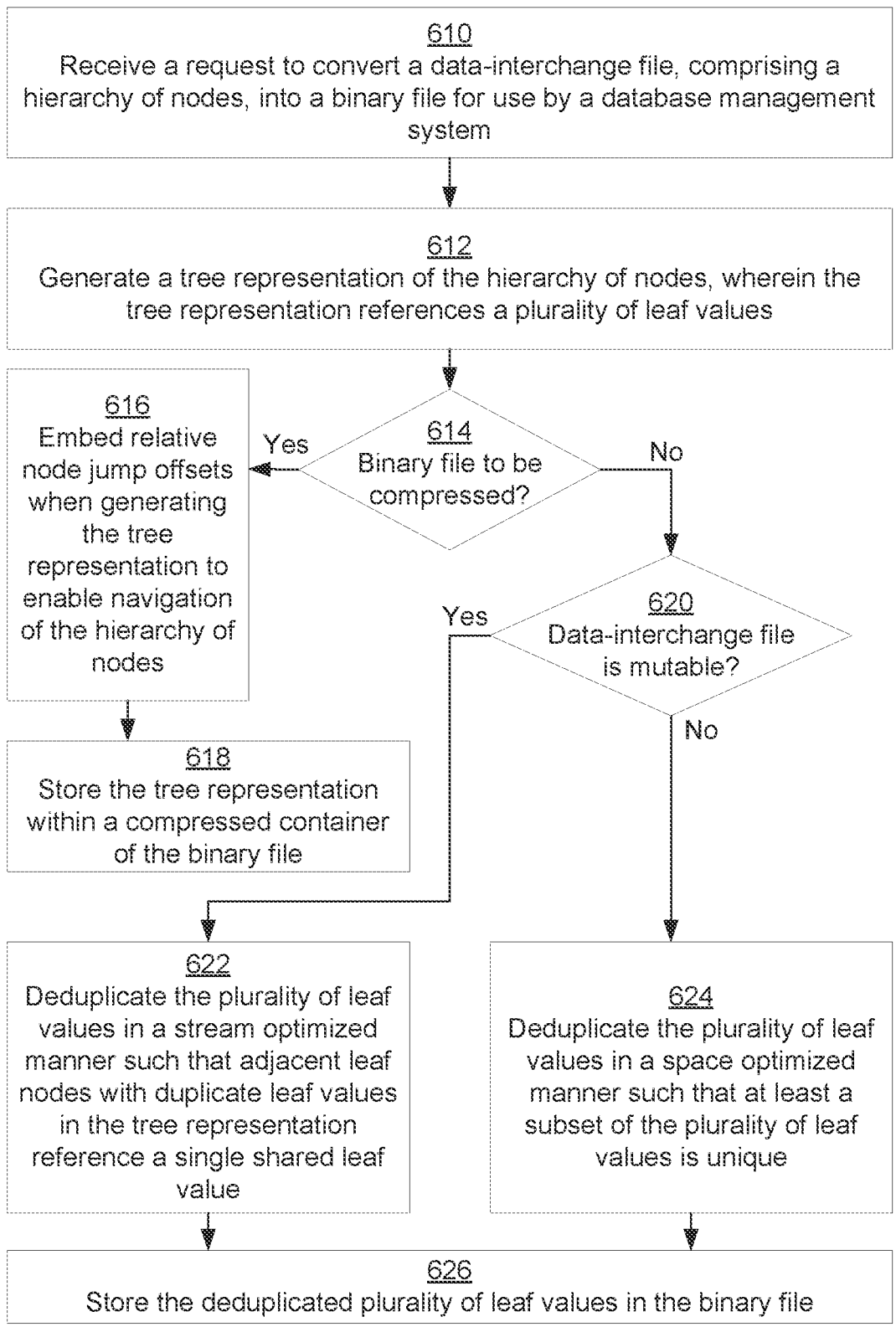
FIG. 6 is a flow diagram that depicts an example process that a computing device may perform to convert a JSON file into an OSON file.

FIG. 6 is a flow diagram that depicts an example process 600 that database management system 110 may perform to convert text JSON file 142 into OSON file 134.

Referring to FIG. 1A, in block 610, database management system 110 receives a request to convert text JSON file 142, comprising a hierarchy of nodes as shown in FIG. 1B, into OSON file 134 for use by database management system 110. For example, as described above, client device 140 may send a request to database management system 110 to convert text JSON file 142 into OSON file 134. Alternatively, JSON to OSON converter 160 may be stored locally on client device 140, in which case client device 140 may perform process 600.

Referring to FIG. 4, in block 612, database management system 110 generates tree 290 of the hierarchy of nodes from text JSON file 142, wherein tree 290 references a plurality of leaf values from text JSON file 142. A specific storage format of the leaf values is further defined depending on whether the leaf values are compressed or deduplicated in a stream or space optimized manner, as discussed in further blocks of process 600.

In block 614, database management system 110 determines whether OSON file 134 is to be compressed or uncompressed. When OSON file 134 is to be compressed, process 600 continues to block 616. Otherwise, when OSON file 134 is to be uncompressed, process 600 continues to block 620.

Referring to FIG. 1A and FIG. 4, in block 616, database management system 110 uses relative offset generator 182 of compressed converter 180 to embed relative node jump offsets 490 when generating tree 290 to enable navigation of tree 290. For example, referring to node 422 of FIG. 5A, each parent node of tree 290 may include a child node mapping 550 that includes relative node jump offsets.

Referring to FIG. 1A and FIG. 2, in block 618, database management system 110 uses data compressor 184 of compressed converter 180 to store tree 290 in relative offset format 280 within compressed container 260. As discussed above, relative offset format 280 provides a lower data entropy to enable a higher compression ratio for compressed container 260. Optionally, leaf value mapping 274 may also be included in relative offset format 280.

Referring to FIG. 1A, in block 620, database management system 110 uses mutable JSON detector 172 to determine whether text JSON file 142 is mutable or immutable. When text JSON file 142 is mutable, process 600 continues to block 622. Otherwise, when text JSON file 142 is immutable, process 600 continues to block 624. As discussed above, mutable JSON detector 172 may detect certain data types, such as blockchain blocks, as immutable, or the immutable property may be defined with the request in block 602.

Referring to FIG. 1A and FIG. 2, in block 622, database management system 110 uses stream optimized leaf value deduplicator 174 to generate stream optimized leaf deduplication 250 such that adjacent leaf nodes with duplicate leaf values in tree 290 reference a single shared leaf value. An example is shown in FIG. 5B, wherein nodes 410 and 412 reference a single shared leaf value "Brown" in leaf value collection 252B.

Referring to FIG. 1A and FIG. 2, in block 624, database management system 110 uses space optimized leaf value deduplicator 176 to generate space optimized leaf deduplication 230 such that at least a subset of the leaf values referenced by tree 290 is unique. For example, referring to leaf value collection 232 in FIG. 3B, it can be observed that the leaf values are unique for each leaf value. In some embodiments, size filter 178 may be used such that only a subset of the leaf values not exceeding a leaf size threshold are unique.

Referring to FIG. 1A, in block 626, database management system 110 stores the deduplicated leaf values from block 622 or block 624 into OSON file 134. For example, referring to FIG. 2 and FIG. 3B, when block 622 was performed, leaf value collection 232 of stream optimized leaf deduplication 250 is stored in OSON file 134B. Referring to FIG. 2 and FIG. 3D, when block 624 was performed, leaf value collection 252B of space optimized leaf deduplication 230 is stored in OSON file 134C.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree) represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Over View

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
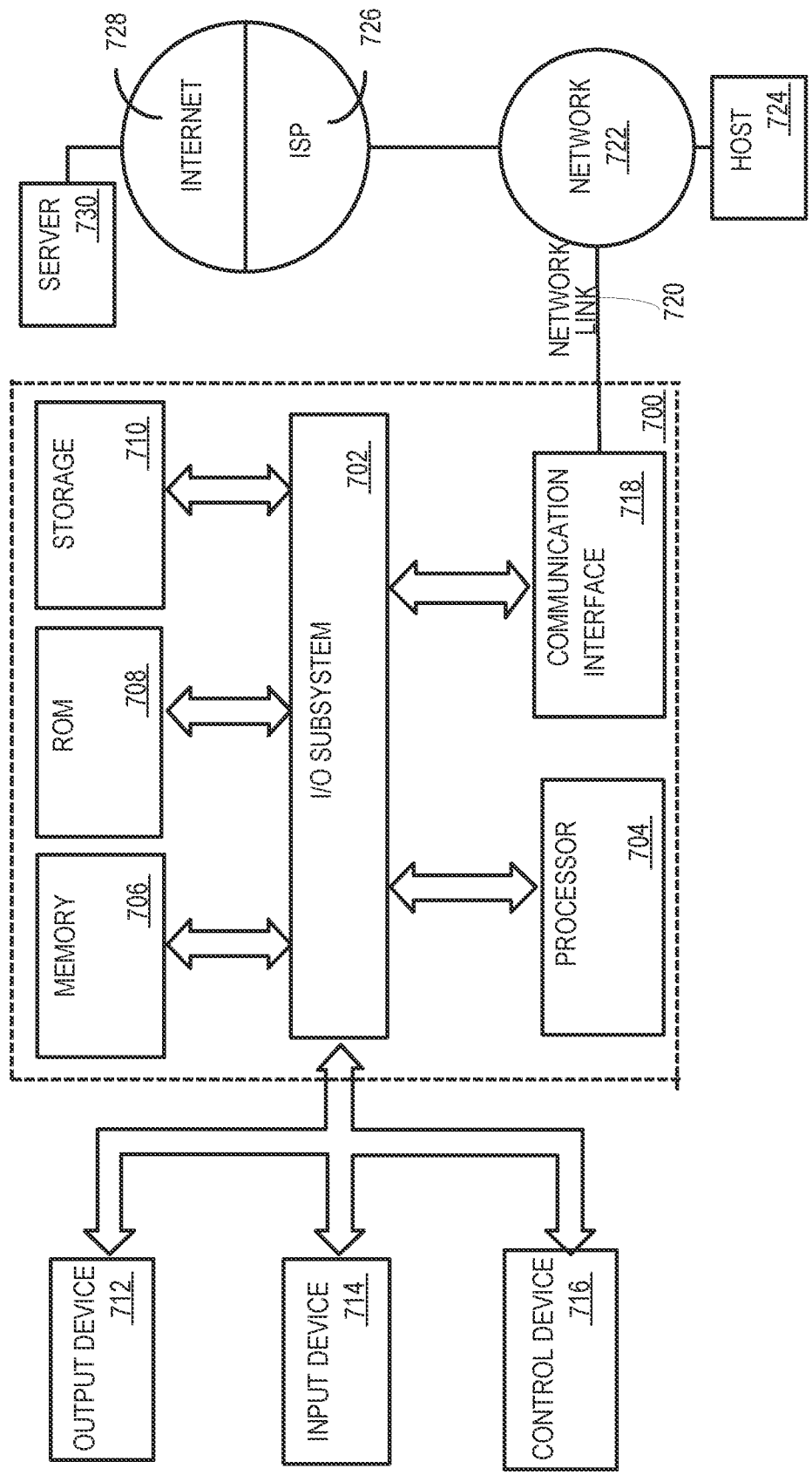
FIG. 7 illustrates a block diagram of a computing device in which the example embodiment(s) of the present invention may be embodiment.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 1030 might transmit a requested code for an application program through Internet 728, ISP 726, local network 722 and communication interface 718.

The received code may be executed by processor 704 as it is received, and/or stored in storage device 710, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 8:
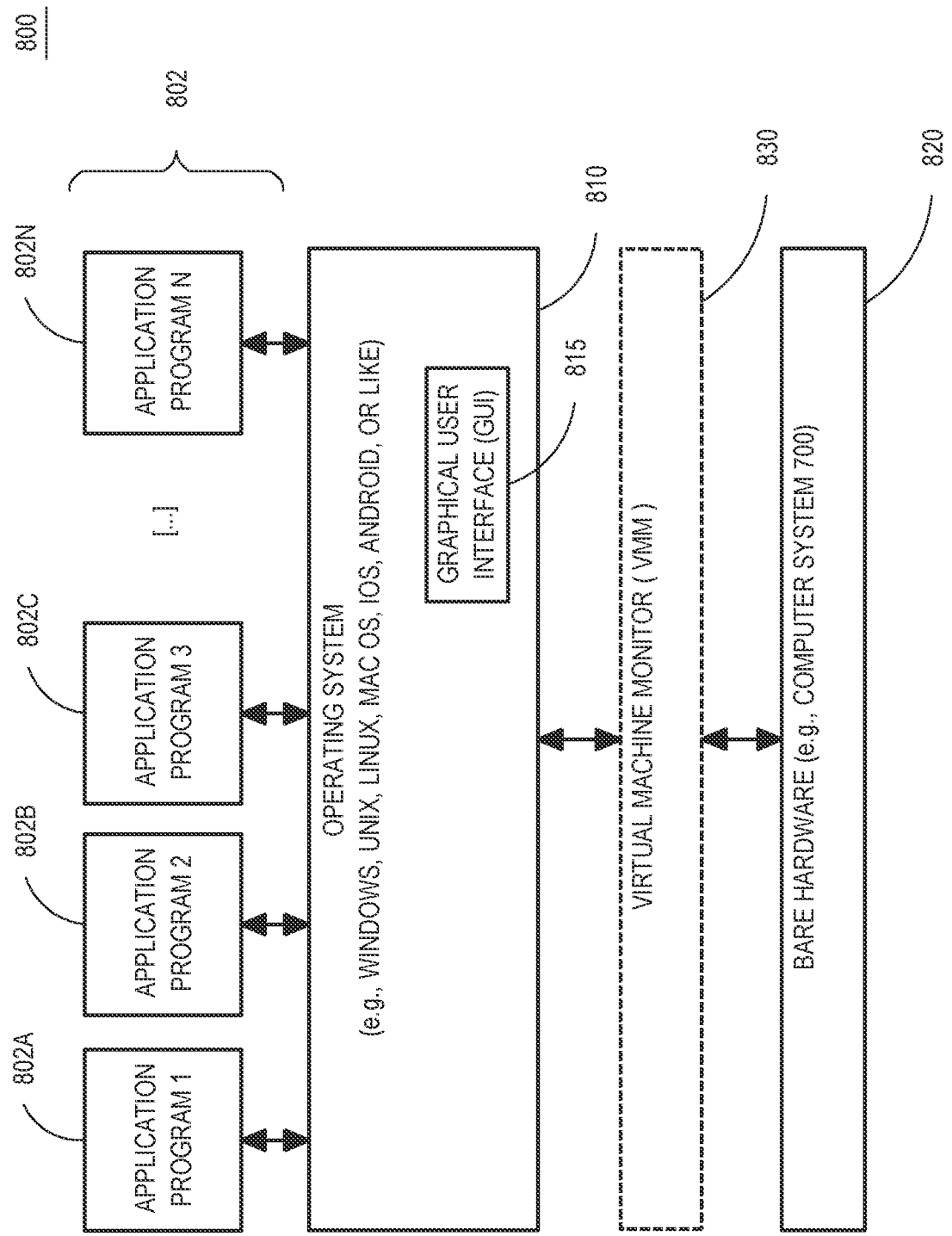
FIG. 8 illustrates a block diagram of a basic software system for controlling the operation of a computing device.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   receiving a request to convert a data-interchange file, comprising a hierarchy of nodes, into a binary file for use by a database management system;
   generating a tree representation of the hierarchy of nodes, wherein the tree representation references a plurality of leaf values;
   determining whether the binary file is to be compressed or uncompressed;
   in response to determining that the binary file is to be compressed:
   embedding relative node jump offsets when generating the tree representation to enable navigation of the hierarchy of nodes; and
   storing the tree representation within a compressed container of the binary file; and
   in response to determining that the binary file is to be uncompressed:
   determining whether the data-interchange file is immutable or mutable;
   in response to determining that the data-interchange file is immutable, deduplicating the plurality of leaf values in a space optimized manner such that at least a subset of the plurality of leaf values is unique; and
   in response to determining that the data-interchange file is mutable, deduplicating the plurality of leaf values in a stream optimized manner such that adjacent leaf nodes with duplicate leaf values in the tree representation reference a single shared leaf value; and
   storing the deduplicated plurality of leaf values in the binary file.

2. The method of claim 1, wherein the at least a subset of the plurality of leaf values comprises each of the plurality of leaf values.

3. The method of claim 1, wherein deduplicating the plurality of leaf values in the stream optimized manner includes reserving, in the plurality of leaf values, one or more common leaf values including at least one of: null, true, false, empty string, 0, 1, empty object, and empty array.

4. The method of claim 1, wherein storing the deduplicated plurality of leaf values in the binary file further includes storing the tree representation in the binary file.

5. The method of claim 1, further comprising:
   deduplicating a plurality of field names from the hierarchy of nodes; and
   storing the deduplicated plurality of field names in the binary file.

6. The method of claim 1, wherein deduplicating the plurality of leaf values in the space optimized manner further includes deduplicating array objects in the tree representation in the space optimized manner, and wherein deduplicating the plurality of leaf values in the stream optimized manner further includes deduplicating array objects in the tree representation in the stream optimized manner.

7. The method of claim 1, further comprising:
   generating a lookup data structure for the plurality of leaf values; and
   storing the lookup data structure in the binary file.

8. The method of claim 1, wherein deduplicating the plurality of leaf values in the stream optimized manner includes a size filter to skip deduplicating leaf values above a size threshold.

9. The method of claim 1, wherein deduplicating the plurality of leaf values in the stream optimized manner includes tracking a last leaf value for each parent node in the tree representation.

10. The method of claim 1, wherein the data-interchange file comprises a JavaScript Object Notation (JSON) text file.

11. One or more non-transitory storage media storing instructions that, when executed by one or more computing devices, cause:
   receiving a request to convert a data-interchange file, comprising a hierarchy of nodes, into a binary file for use by a database management system;
   generating a tree representation of the hierarchy of nodes, wherein the tree representation references a plurality of leaf values;
   determining whether the binary file is to be compressed or uncompressed;
   in response to determining that the binary file is to be compressed:
   embedding relative node jump offsets when generating the tree representation to enable navigation of the hierarchy of nodes; and
   storing the tree representation within a compressed container of the binary file; and
   in response to determining that the binary file is to be uncompressed:
   determining whether the data-interchange file is immutable or mutable;
   in response to determining that the data-interchange file is immutable, deduplicating the plurality of leaf values in a space optimized manner such that at least a subset of the plurality of leaf values is unique; and
   in response to determining that the data-interchange file is mutable, deduplicating the plurality of leaf values in a stream optimized manner such that adjacent leaf nodes with duplicate leaf values in the tree representation reference a single shared leaf value; and
   storing the deduplicated plurality of leaf values in the binary file.

12. The one or more non-transitory storage media of claim 11, wherein the at least a subset of the plurality of leaf values comprises each of the plurality of leaf values.

13. The one or more non-transitory storage media of claim 11, wherein deduplicating the plurality of leaf values in the stream optimized manner includes reserving, in the plurality of leaf values, one or more common leaf values including at least one of: null, true, false, empty string, 0, 1, empty object, and empty array.

14. The one or more non-transitory storage media of claim 11, wherein storing the deduplicated plurality of leaf values in the binary file further includes storing the tree representation in the binary file.

15. The one or more non-transitory storage media of claim 11, further comprising:
deduplicating a plurality of field names from the hierarchy of nodes; and
storing the deduplicated plurality of field names in the binary file.

16. The one or more non-transitory storage media of claim 11, wherein deduplicating the plurality of leaf values in the space optimized manner further includes deduplicating array objects in the tree representation in the space optimized manner, and wherein deduplicating the plurality of leaf values in the stream optimized manner further includes deduplicating array objects in the tree representation in the stream optimized manner.

17. The one or more non-transitory storage media of claim 11, further comprising:
generating a lookup data structure for the plurality of leaf values; and
storing the lookup data structure in the binary file.

18. The one or more non-transitory storage media of claim 11, wherein deduplicating the plurality of leaf values in the stream optimized manner includes a size filter to skip deduplicating leaf values above a size threshold.

19. The one or more non-transitory storage media of claim 11, wherein deduplicating the plurality of leaf values in the stream optimized manner includes tracking a last leaf value for each parent node in the tree representation.

20. The one or more non-transitory storage media of claim 11, wherein the data-interchange file comprises a JavaScript Object Notation (JSON) text file.

* * * * *